United States Patent
Kobayashi

(10) Patent No.: US 7,627,226 B2
(45) Date of Patent: Dec. 1, 2009

(54) REPRODUCING APPARATUS, REPRODUCING METHOD, TRANSMITTING APPARATUS AND TRANSMITTING METHOD

(75) Inventor: Takashi Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 984 days.

(21) Appl. No.: 09/962,066

(22) Filed: Sep. 25, 2001

(65) Prior Publication Data

US 2002/0044758 A1 Apr. 18, 2002

(30) Foreign Application Priority Data

Sep. 25, 2000 (JP) ............................. 2000-291261

(51) Int. Cl.
*H04N 5/91* (2006.01)
(52) U.S. Cl. .............................. 386/68; 386/86; 386/87; 386/52; 386/119; 386/83
(58) Field of Classification Search ................. 386/112, 386/68, 86–87, 83, 119, 52
See application file for complete search history.

(56) References Cited

U.S. PATENT DOCUMENTS

| | | | | |
|---|---|---|---|---|
| 4,635,138 | A | * | 1/1987 | Louth ........................... 386/68 |
| 5,377,051 | A | * | 12/1994 | Lane et al. ..................... 386/81 |
| 5,758,085 | A | * | 5/1998 | Kouoheris et al. ........... 709/231 |
| 5,771,330 | A | * | 6/1998 | Takano et al. ................. 386/52 |
| 5,963,521 | A | * | 10/1999 | Nagashima et al. ...... 369/53.37 |
| 6,026,506 | A | * | 2/2000 | Anderson et al. ........... 714/746 |
| 6,226,442 | B1 | * | 5/2001 | Park .............................. 386/46 |
| 6,259,857 | B1 | * | 7/2001 | Miyahara et al. .............. 386/68 |

(Continued)

FOREIGN PATENT DOCUMENTS

JP 11-205358 7/1999

(Continued)

OTHER PUBLICATIONS

IEC 61883-1, Consumer audio/video equipment—Digital interface—Part 1: General, First edition Feb. 1998, pp. 1-83.

(Continued)

*Primary Examiner*—Thai Tran
*Assistant Examiner*—Helen Shibru
(74) *Attorney, Agent, or Firm*—Cowan, Liebowitz & Latman, P.C.

(57) ABSTRACT

A reproducing apparatus calculates available dubbing speeds based on a transmission capacity of the reproducing apparatus. The reproducing apparatus selects a dubbing speed N among the available dubbing speeds, wherein N is 2, 4 or 8. The reproducing apparatus reproduces digital information including a plurality of fixed-length packets from a first recording medium at a bit rate corresponding to the dubbing speed N. The reproducing apparatus (a) determines the number of the fixed-length packets included in one transmission packet in accordance with the dubbing speed N, (b) generates transmission packets from the digital information reproduced from the first recording medium, wherein each of the transmission packets includes the determined number of fixed-length packets, and (c) transmits the transmission packets to an external recording device so that the external recording device can record the digital information to a second recording medium at a bit rate corresponding to the dubbing speed N.

15 Claims, 7 Drawing Sheets

U.S. PATENT DOCUMENTS

| | | | |
|---|---|---|---|
| 6,289,427 B1 * | 9/2001 | Tanaka | 711/201 |
| 6,460,086 B1 * | 10/2002 | Swaminathan et al. | 709/236 |
| 6,516,135 B1 * | 2/2003 | Higuchi et al. | 386/112 |
| 6,529,969 B1 | 3/2003 | Inoue | |
| 6,538,656 B1 * | 3/2003 | Cheung et al. | 345/519 |
| 6,606,449 B1 * | 8/2003 | Ishikawa | 386/52 |
| 6,671,408 B1 * | 12/2003 | Kaku | 382/232 |
| 6,697,432 B2 * | 2/2004 | Yanagihara et al. | 375/240.26 |
| 7,095,948 B2 * | 8/2006 | Teunissen | 386/68 |
| 7,225,163 B1 * | 5/2007 | Han | 705/52 |
| 2001/0041049 A1 * | 11/2001 | Kanda | 386/52 |
| 2002/0044758 A1 * | 4/2002 | Kobayashi | 386/52 |
| 2002/0131508 A1 * | 9/2002 | Otaka et al. | 375/240.26 |
| 2008/0080342 A1 * | 4/2008 | Osaki | 369/47.12 |

FOREIGN PATENT DOCUMENTS

| | | |
|---|---|---|
| JP | 11-308203 | 11/1999 |
| JP | 2000-196611 | 7/2000 |

OTHER PUBLICATIONS

IEC 61883-4, Consumer audio/video equipment—Digital interface—Part 4: MPEG2-TS data transmission, First edition Feb. 1998, pp. 1-23.

* cited by examiner

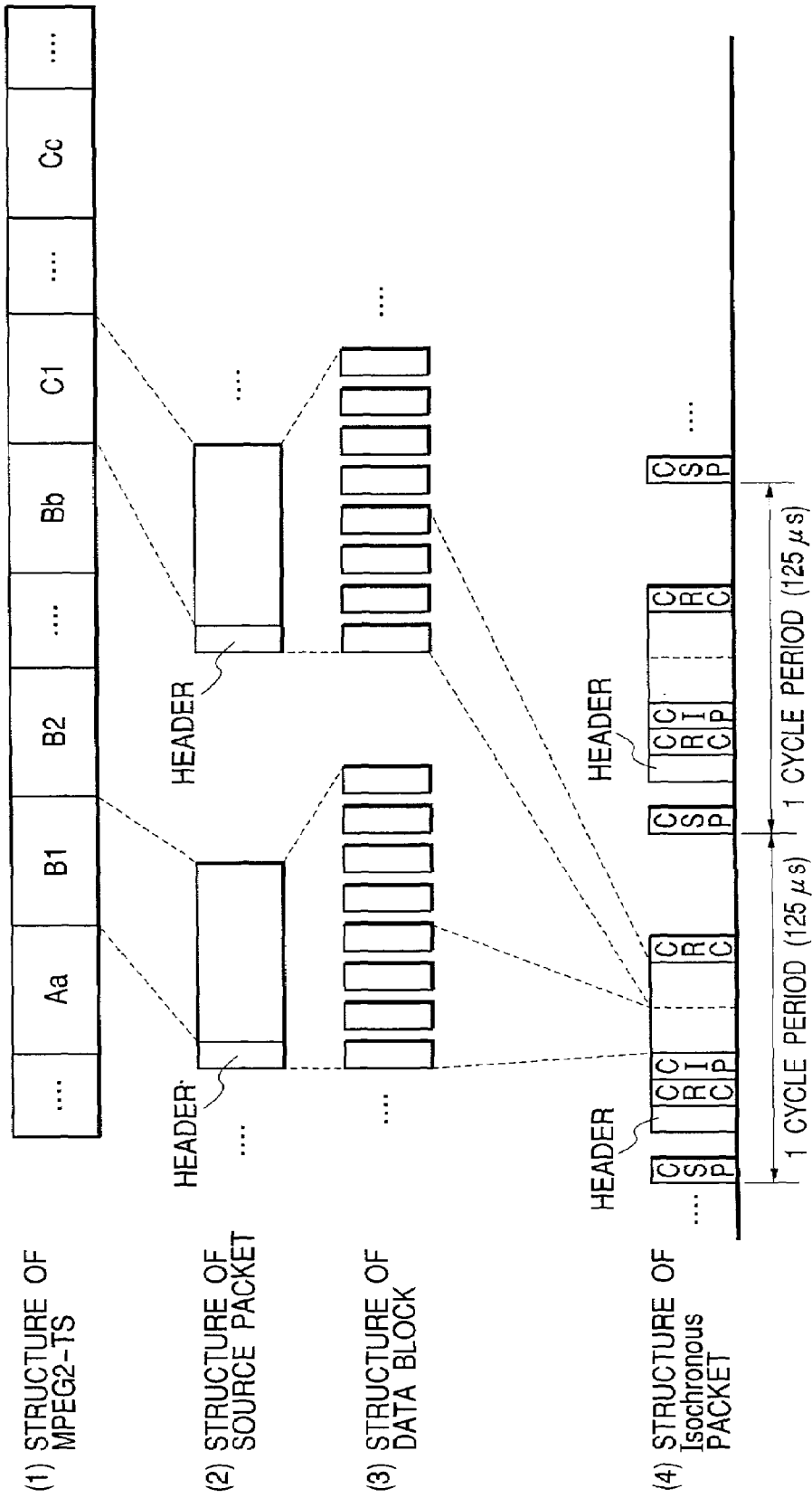

REPRODUCING APPARATUS, REPRODUCING METHOD, TRANSMITTING APPARATUS AND TRANSMITTING METHOD

BACKGROUND OF THE INVENTION

1. Field of the Invention

The present invention relates to a reproducing apparatus, reproducing method, transmitting apparatus, and transmitting method which digitally transmit audio and video programs each made up of digital video data and digital audio data.

2. Related Background Art

Recently, as one of data formats for multiplexing and transmitting a plurality of audio and video programs, a transport stream standard (hereinafter, referred to as "MPEG-2 TS") is known, which being defined as the MPEG-2 system standard (the ISO/IEC 13818-1 standard). The MPEG-2 TS defines the constitution of each audio or video program consisting of a plurality of MPEG-2 TS packets (One MPEG-2 TS packet is a fixed length packet of 188 bytes) and the arrangement of MPEG-2 TS packets by time division.

In addition, recently, as one of techniques for digitally transmitting a MPEG-2 TS packet, the IEEE1394-1995 High Performance Serial Bus Standard (hereinafter, referred to as "the IEEE1394-1995 standard") is suggested.

In a case that a MPEG-2 packet of a desired audio or video program is transmitted by using an isochronous transfer mode in accordance with the IEEE1394-1995 standard, the transmission rate is determined according to the bit rate of this program. For this reason, in a case of digitally dubbing the desired audio or video program in an external recording apparatus by using a digital interface in accordance with the IEEE1394-1995 standard, a period of time equivalent to that required for reproducing the program is required. Accordingly, in a case of digitally dubbing a certain audio or video program, both reproducing party and recording party cannot be used even for a few hours.

SUMMARY OF THE INVENTION

An object of the present invention is to solve the above-described problems.

Further, another object of the present invention is to perform a high speed dubbing of desired audio and video programs by using a digital interface.

According to a preferred embodiment of the present invention, there is disclosed a reproducing apparatus comprising: reproducing means for reproducing the digital information constituted by plural fixed-length packets by N times (N is a natural number) bit rate of a usual bit rate, and transmitting means for generating plural data blocks from the fixed-length packets reproduced by the N times bit rate of the usual bit rate, storing the N times data blocks to a transmission packet and transmitting the N times data blocks to an external recording device.

Further, according to a preferred embodiment of the present invention, there is disclosed a reproducing method comprising the steps of: reproducing digital information constituted by plural fixed-length packets by N times (N is a natural number) bit rate of a usual bit rate, and generating plural data blocks from the fixed-length packets reproduced by the N times bit rate of the usual bit rate, storing the usual N times data block to a transmission packet and then.

Further, according to a preferred embodiment of the present invention, there is disclosed a transmitting apparatus comprising: input means for inputting digital information constituted by plural fixed-length packets by N times bit rate of a usual bit rate, and transmitting means for generating plural data blocks from the fixed-length packets reproduced by the N times bit rate, storing the usual N times data blocks to a transmission packet and transmitting the N times data blocks to an external recording device.

Further, according to a preferred embodiment of the present invention, there is disclosed a reproducing method comprising the steps of: inputting digital information constituted by plural fixed-length packets by N times bit rate of a usual bit rate, and generating plural data blocks from the fixed-length packets reproduced by N times bit rate of a usual bit late, storing the usual N times data blocks to a transmission packet and then transmitting the N times data blocks to an external recording device.

Further, according to the preferred embodiment of the present invention, there is disclosed a reproducing apparatus comprising: reproducing means for reproducing the digital information constituted by a transport stream packet regulated as MPEG-2 system standard, and transmitting means for generating plural data blocks from the transport stream packets reproduced by usual N times bit rate of a usual bit rate, storing the usual N times data blocks to a transmission packet and then transmitting the N times data blocks to an external recording device.

Further, according to the preferred embodiment of the present invention, there is disclosed a reproducing method comprising the steps of: reproducing digital information constituted by a transport stream packet regulated as MPEG-2 system standard, and generating plural data blocks from the transport stream packets reproduced by N times bit rate of a usual bit rate, storing the usual N times data blocks to a transmission packet and then transmitting the N times data blocks to an external recording device.

Further, according to the preferred embodiment of the present invention, there is disclosed a transmitting apparatus comprising: input means for inputting digital information constituted by a transport stream packet regulated as MPEG-2 system standard, and transmitting means for generating plural data blocks from the transport stream packets reproduced by N times bit rate of a usual bit rate, storing the usual N times data blocks to a transmission packet and then transmitting the N times data blocks to an external recording device.

Further, according to the preferred embodiment of the present invention, there is disclosed a transmitting method comprising the steps of: inputting digital information constituted by a transport stream packet regulated as MPEG-2 system standard, and generating plural data blocks from the transport stream packets reproduced by N times bit rate of a usual bit rate, storing the usual N times data blocks to a transmission packet and then transmitting the N times data blocks to an external recording device.

Still other objects of the present invention, and the advantage thereof, will become fully apparent from the following detailed description of the embodiments.

BRIEF DESCRIPTION OF THE DRAWINGS

The above objects, features and advantages of the present invention will become more apparent from the following detailed description when taken in conjunction with the accompanying drawings, in which:

FIG. 7 is a schematic view illustrating the process order of a high speed dubbing method in accordance with the second embodiment.

DETAILED DESCRIPTION OF THE PREFERRED EMBODIMENTS

The preferred embodiments of the present invention will now be described in detail hereinafter with reference to the accompanying drawings.

First Embodiment

Figure 1:
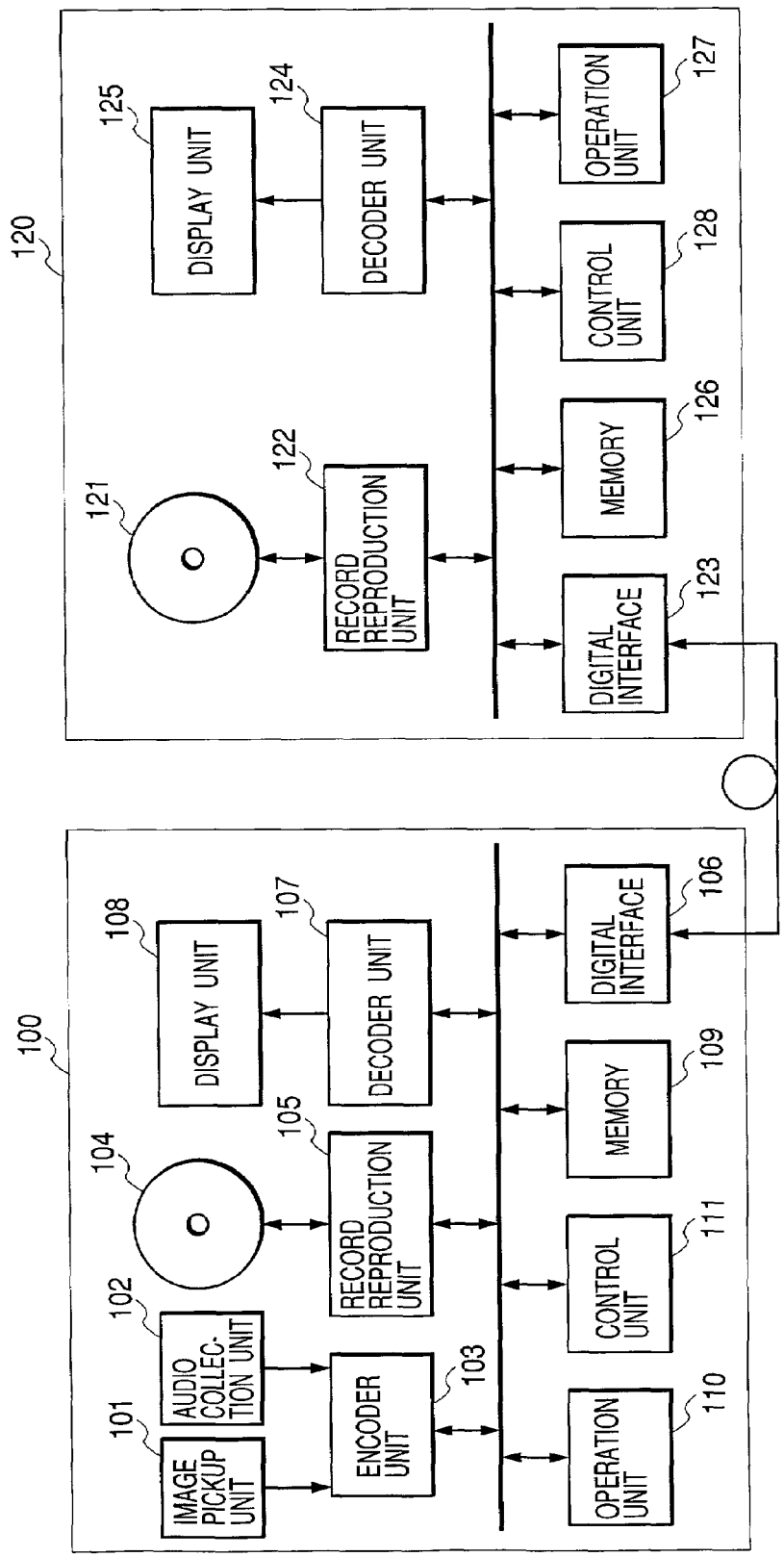
FIG. 1 is a block diagram illustrating the structure of a dubbing system in accordance with a first embodiment.

FIG. 1 is a block diagram illustrating the structure of a dubbing system in accordance with a first embodiment. In FIG. 1, 100 represents a camera integral digital video recorder and 120 represents a digital video recorder.

Both camera integral digital video recorder 100 and digital video recorder 120 are capable of recording, reproducing, digital inputting and digital outputting audio and video programs (hereinafter, referred to as "AV programs") multiplexed according to the transport stream protocol of the MPEG-2 standard (MPEG-2 TS). Here, each AV program is made up of digital video data, digital audio data and auxiliary data, respectively.

In addition, both camera integral digital video recorder 100 and digital video recorder 120 have a dubbing mode as one of operation modes. The dubbing mode includes two dubbing methods, i.e. a usual dubbing method and a high speed dubbing method.

In the usual dubbing method, a MPEG-2 TS packet of a certain AV program recorded on a recording medium of a reproducing party is reproduced at a usual bit rate. The MPEG-2 TS packet reproduced at the usual bit rate is isochronously transferred at a usual transmission rate. The MPEG-2 TS packet isochronously transferred at the usual transmission rate is recorded on the recording medium of the recording party at the usual bit rate.

Meanwhile, in the high speed dubbing method, a MPEG-2 TS packet of a certain AV program recorded on a recording medium of a reproducing party is reproduced at N times bit rate of the usual bit rate. The MPEG-2 TS packet reproduced at the N times bit rate of the usual bit rate is isochronously transferred at N times transmission rate of the usual transmission rate. The MPEG-2 TS packet isochronously transferred at the N times transmission rate of the usual transmission rate is recorded on the recording medium of the recording party at the N times bit rate of the usual bit rate.

Next, the structure of the camera integral digital video recorder 100 will now be explained with reference to FIG. 1. In FIG. 1, 101 represents an image pickup unit, 102 represents an audio collection unit, 103 represents an encoder unit, 104 represents a recording medium, 105 represents a record reproduction unit, 106 represents a digital interface, 107 represents a decoder unit, 108 represents a display unit, 109 represents a memory, 110 represents an operation unit, and 111 represents a control unit.

In the image pickup mode, the image pickup unit 101 converts an optical image of an object into a digital video data of a predetermined format and supplies the same to the encoder unit 103. In the image pickup mode, the audio collection unit 102 converts an audio signal collected by a microphone and the like into a digital audio data of a predetermined format and supplies the same to the encoder unit 103.

The encoder unit 103 encodes (high efficiency coding) the digital video data supplied from the image pickup unit 101 and the digital audio data supplied from the audio pickup unit 102 according to the MPEG-2 standard. In addition, the encoder 103 generates a MPEG-2 TS packet as the encoded digital video data, digital audio data and auxiliary data. The MPEG-2 TS packet generated from the encoder unit 103 is supplied to the record reproduction unit 105.

The record reproduction unit 105 records the MPEG-2 TS packet generated from the encoder unit 103 on the recording medium 104, or records the MPEG-2 TS packet received from the digital interface 106 on the recording medium 104. In addition, the record reproduction unit 105 reproduces the MPEG-2 TS packet recorded on the recording medium 104. Here, the recording medium 104 of this embodiment is a recording medium capable of random access such as an optical disk, optical magnetic disk, hard disk, semiconductor memory, etc. The MPEG-2 TS packet reproduced in the recording medium 104 is supplied to the digital interface 106 and the memory 109.

The digital interface 106 is a digital interface in conformity with the IEEE1394-1995 standard and its extended standard (hereinafter, referred to as "the IEEE1394 standard"). The digital interface 106 isochronously transmits the MPEG-2 TS packet reproduced in the record reproduction unit 105, or receives the MPEG-2 TS packet isochronously transmitted from another apparatus. The MPEG-2 TS packet isochronously transmitted from another apparatus is supplied to the record reproduction unit 105 and the memory 109.

The decoder unit 107 reconfigures AV programs (made up of digital video data, digital audio data and auxiliary data) from the MPEG-2 TS packet read from the memory 109. The reconfigured AV programs are decoded according to the MPEG-2 standard.

The display unit 108 displays the digital video data supplied from the decoder unit 107 on a display unit such as a liquid crystal panel and the like, or produces the digital audio data supplied from the decoder unit 107 through a speaker.

The operation unit 110 includes operation keys, operation buttons, operation panels, etc. A user enters an instruction for controlling the operation of the camera integral digital video recorder 100 by operating the operation unit 110, sets the operation mode of the camera integral digital video recorder 100 to a dubbing mode, or sets a dubbing speed in the case that the high speed dubbing method is selected.

The control unit 111 controls the operation of the camera integral digital video recorder 100, or controls the recording rate or reproducing rate of the record reproduction unit 105 according to the selected dubbing speed. In addition, the control unit 111 controls the transmission rate of the digital interface 106 according to the selected dubbing speed.

Next, the structure of the digital video recorder 120 will now be explained with reference to FIG. 1. In FIG. 1, 121 represents a recording medium, 122 represents a record reproduction unit, 123 represents a digital interface, 124 represents a decoder unit, 125 represents a display unit, 126 represents a memory, 127 represents an operation unit, and 128 represents a control unit.

The record reproduction unit 122 records a MPEG-2 TS packet received from the digital interface 123 on a recording medium 121, reproduces the MPEG-2 TS packet recorded on the recording medium 121, or reproduces the MPEG-2 TS packet recorded on the recording medium 121. Here, like the recording medium 104, the recording medium 121 of this embodiment is a recording medium capable of random access such as an optical disk, optical magnetic disk, hard disk, semiconductor memory, etc. The MPEG-2 TS packet corresponding to a desired AV program reproduced from the recording medium 121 is supplied to the digital interface 123 and the memory 126.

The digital interface 123, like the digital interface 106, is a digital interface in conformity with the IEEE1394 standard. The digital interface 123 isochronously transmits the MPEG-2 TS packet reproduced in the record reproduction unit 122, or receives the MPEG-2 TS packet isochronously transmitted from another apparatus. The MPEG-2 TS packet isochronously transmitted from another apparatus is supplied to the record reproduction unit 122 and the memory 126.

The decoder unit 124 reconfigures AV programs (made up of digital video data, digital audio data and auxiliary data etc.) from the MPEG-2 TS packet read from the memory 126. The reconfigured AV programs are decoded according to the MPEG-2 standard.

The display unit 125 displays the digital video data supplied from the decoder unit 124 on a display unit such as a liquid crystal panel and the like, or produces the digital audio data supplied from the decoder unit 124 through a speaker.

The operation unit 127 includes operation keys, operation buttons, operation panels, etc. A user enters an instruction for controlling the operation of the digital video recorder 120 by operating the operation unit 127, sets the operation mode of the digital video recorder 120 to a dubbing mode, or sets a dubbing speed in the case that the high speed dubbing method is selected.

The control unit 128 controls the operation of the digital video recorder 120, or controls the recording rate or reproducing rate of the record reproduction unit 122 according to the selected dubbing speed. In addition, the control unit 128 controls the transmission rate of the digital interface 123 according to the selected dubbing speed.

Next, the process order of a dubbing system in accordance with the first embodiment will now be explained with reference to FIGS. 2 through 5.

Figure 2:
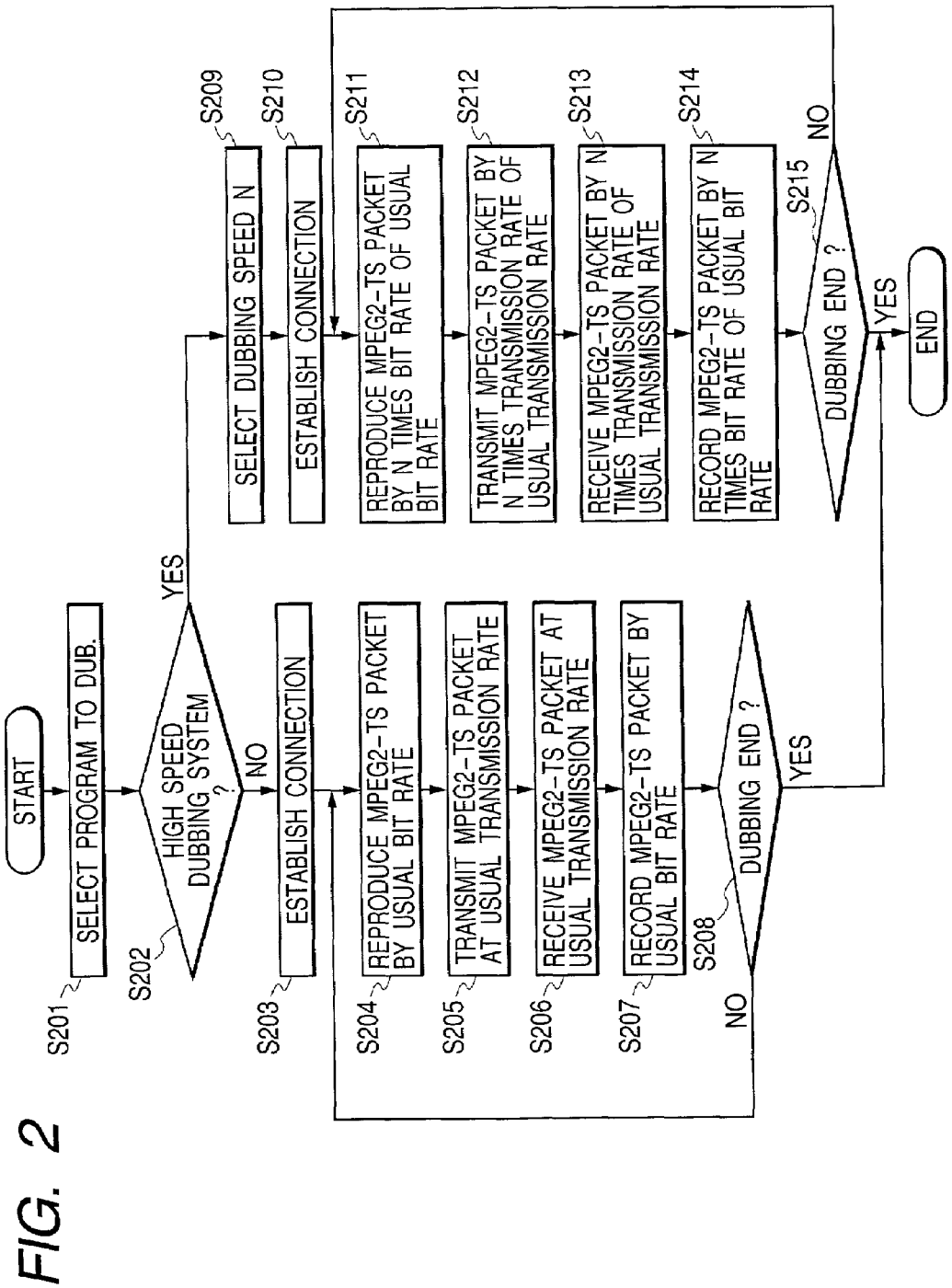
FIG. 2 is a flow chart illustrating the process order of the dubbing system in accordance with the first embodiment.

FIG. 2 is a flow chart illustrating the process order of the dubbing system in accordance with the first embodiment. In the first embodiment, the camera integral digital video recorder 100 is a reproduction party (transmission party), and the digital video recorder 120 is a recording party (receiving party). At this time, the order of dubbing an AV program selected by the user between the camera integral digital video recorder 100 and the digital video recorder 120 will now be explained.

In step S201, the user operates the operation unit 110 of the camera integral digital video recorder 100, sets the current operation mode to a dubbing mode, and then selects one or plural AV programs to dub on the digital video recorder 120 from AV programs recorded on the recording medium 104. In this embodiment, a case of selecting AV programs B and C with a bit rate of approximately 5 Mbps will now be explained with reference to FIG. 3.

In step S202, the control unit 111 of the camera integral digital video recorder 100 inquires of the user about a dubbing method of AV programs B and C. In a case that the user selects a usual dubbing method, the routine proceeds to step S203. In a case that the user selects a high speed dubbing method, the routine proceeds to step S209.

Firstly, the case that the user selects the usual dubbing method will be explained. At this time, the camera integral digital video recorder 100 informs the digital video recorder 120 of the selection of the usual dubbing method.

In step S203, the digital interface 106 of the camera integral digital video recorder 100 acquires an isochronous resource required for a usual dubbing of AV programs B and C, and establishes one logical signal circuit (connection).

In step S204, the record reproduction unit 105 of the camera integral digital video recorder 100 reproduces the MPEG-2 TS packet of AV programs B and C at a usual bit rate in the recording medium 104. The reproduced MPEG-2 TS packet is supplied to the digital interface 106 and the memory 109.

Figure 3:
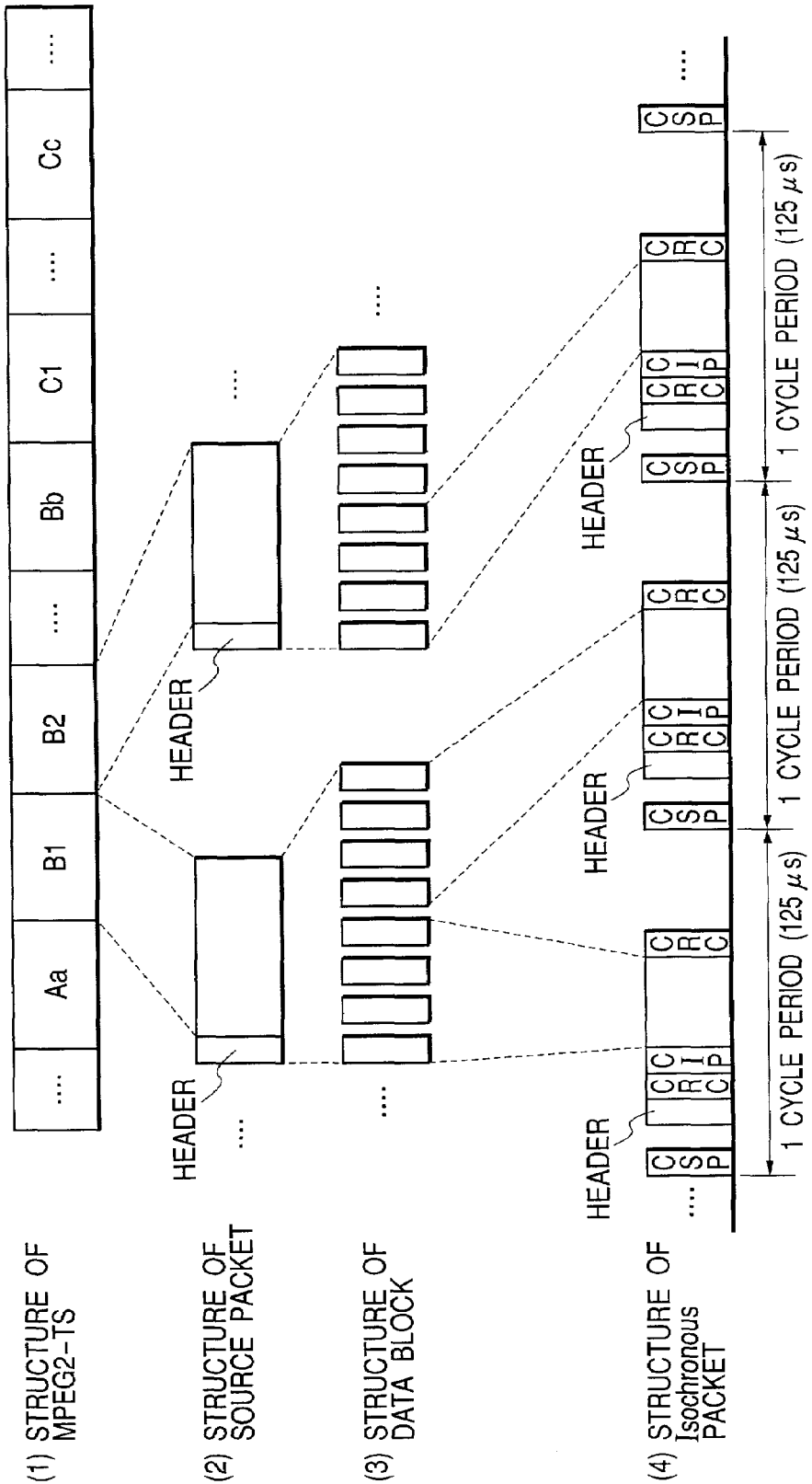
FIG. 3 is a schematic view illustrating the process order of a usual dubbing method in accordance with the first embodiment.

In step S205, the digital interface 106 of the camera integral digital video recorder 100 generates an isochronous packet from the MPEG-2 TS packet reproduced from the record reproduction unit 105 according to the order as shown in FIG. 3. The generated isochronous packet is isochronously transmitted to the digital interface 123 of the digital video recorder 120 by interfacing the connection established in step S203.

The process order of a usual dubbing method in accordance with the first embodiment will now be explained in detail with reference to FIG. 3.

(1) of FIG. 3 is a view illustrating an example of a MPEG-2 TS packet recorded on the recording medium 104. Each of MPEG-2 TS packets B1 through Bb and C1 through Cc respectively constituting AV programs B and C has a fixed length of 188 bytes. The record reproduction unit 105 sequentially reproduces the MPEG-2 TS packet of AV programs B and C at a usual bit rate, and supplies the same to the digital interface 106.

(2) of FIG. 3 is a view explaining the order of generating a source packet from each MPEG-2 TS packet. The digital interface 106 adds a source packet header of 4 bytes to each of the MPEG-2 TS packets B1 through Bb and C1 through Cc supplied from the record reproduction unit 105, and generates a source packet (one source packet is 192 bytes). This source packet header contains a time stamp (time information) of 25 bits. The receiving party controls timing for reproducing AV programs with reference to this time stamp.

(3) of FIG. 3 is a view explaining the order of generating a data block from each source packet. The digital interface 106 divides each source packet into data blocks of 24 bytes. Resultantly, 8 data blocks are generated from one source packet.

(4) of FIG. 3 is a view explaining the order of generating one isochronous packet from a plurality of data blocks. The digital interface 106 determines a number M (M=0, 1, 2, 3, 4, 8, multiples of 8 . . . ) stored in one isochronous packet according to the bit rate of AV programs B and C.

The relationship between the number M of data blocks contained in one isochronous packet and the transmission rate will now be described as follows:

where, M=1, the transmission rate is 1.504 Mbps,
where, M=2, the transmission rate is 3.008 Mbps,
where, M=4, the transmission rate is 6.016 Mbps,
where, M=8, the transmission rate is 12.032 Mbps,
where, M=16, the transmission rate is 24.064 Mbps,
where, M=24, the transmission rate is 36.096 Mbps,
where, M=32, the transmission rate is 48.128 Mbps.

In this embodiment, when isochronously transmitting AV programs B and C about 5 Mbps, four data blocks are stored to one isochronous packet. Each of isochronous packets stored four data blocks is transmitted isochronously through one connection at every communication cycle of about 125 μs.

Next, a basic structure of the isochronous packet will be described with reference to FIG. 5.

Figure 5:
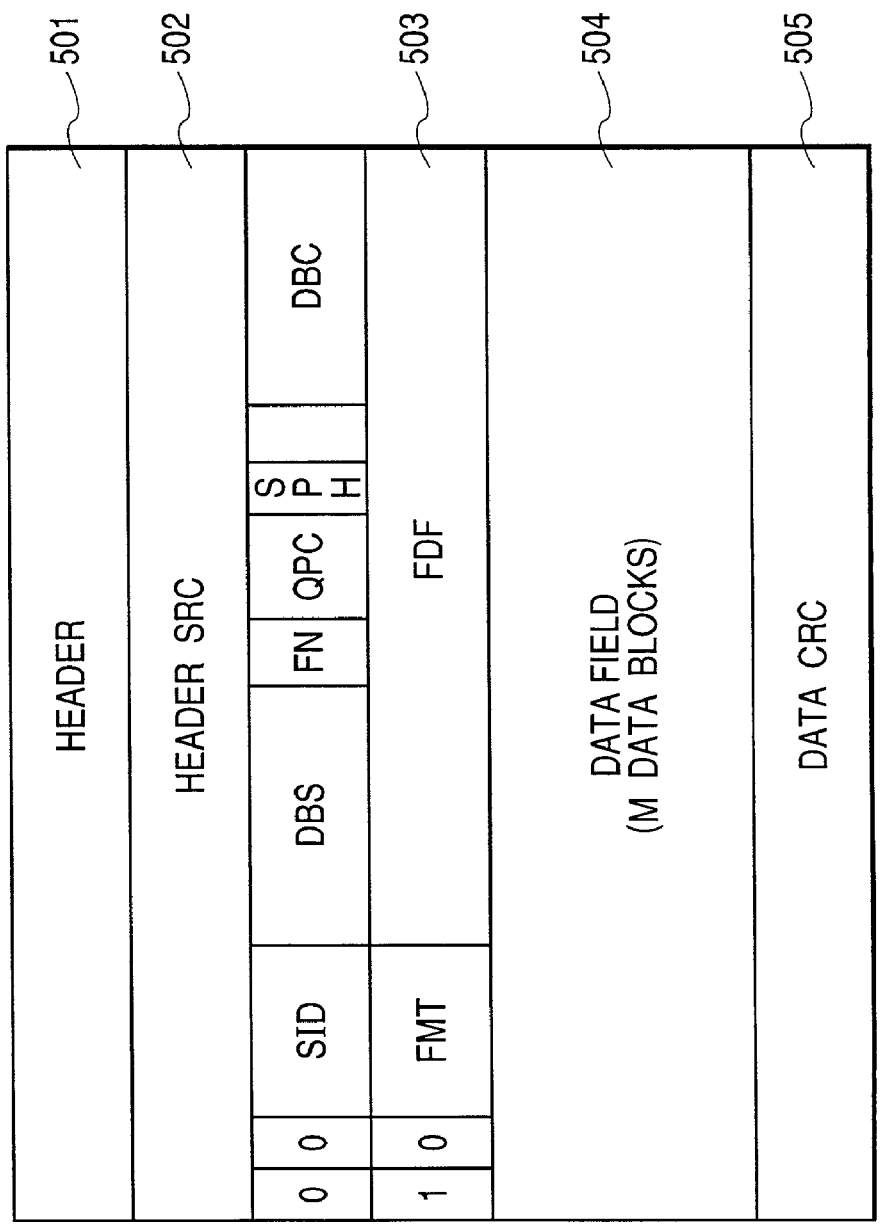
FIG. 5 is a view illustrating the constitution of an isochronous packet.

In FIG. 5, 501 represents a header of isochronous packet, 502 represents a header CRC (Cyclic Redundancy Check) to the header 501, 503 represents a CIP (Common Isochronous Packet) header, 504 represents a data field for storing a number M of data blocks, 505 represents a CIP header, and 504 represents a data CRC to the data field 504.

Also, in the CIP header 503, a node ID of a node for transmitting isochronous packet is stored to a SID (Source Node ID). In this embodiment, since the camera integral digital video recorder 100 becomes a transmission node, the node ID allocated to the camera integral digital video recorder 100 is stored. A code representing a data size of one data block is stored to a DBS (Data Block Size). In this embodiment, since the data size of one data block is 24 bytes, a code representing 24 bytes is stored. A code representing the number of data blocks divided as one source packet is stored to a FN (Fraction Number). In this embodiment, since one source packet is divided into 8 data blocks, a code representing 8 is stored. A code representing whether a source packet header is given or not is stored to a SPH (Source Packet Header). In this embodiment, since a source packet header is given, a code representing 'existence' is stored. A count value representing a continuity of a data block is stored to a DBC (Data Block Count). A code representing a data format of data stored to the data field is stored to a FMT (Format ID). In this embodiment, since a number M of data blocks produced in MPEG-2 TS packet is stored, a code representing 'MPEG-2 TS' is stored.

Figure 4:
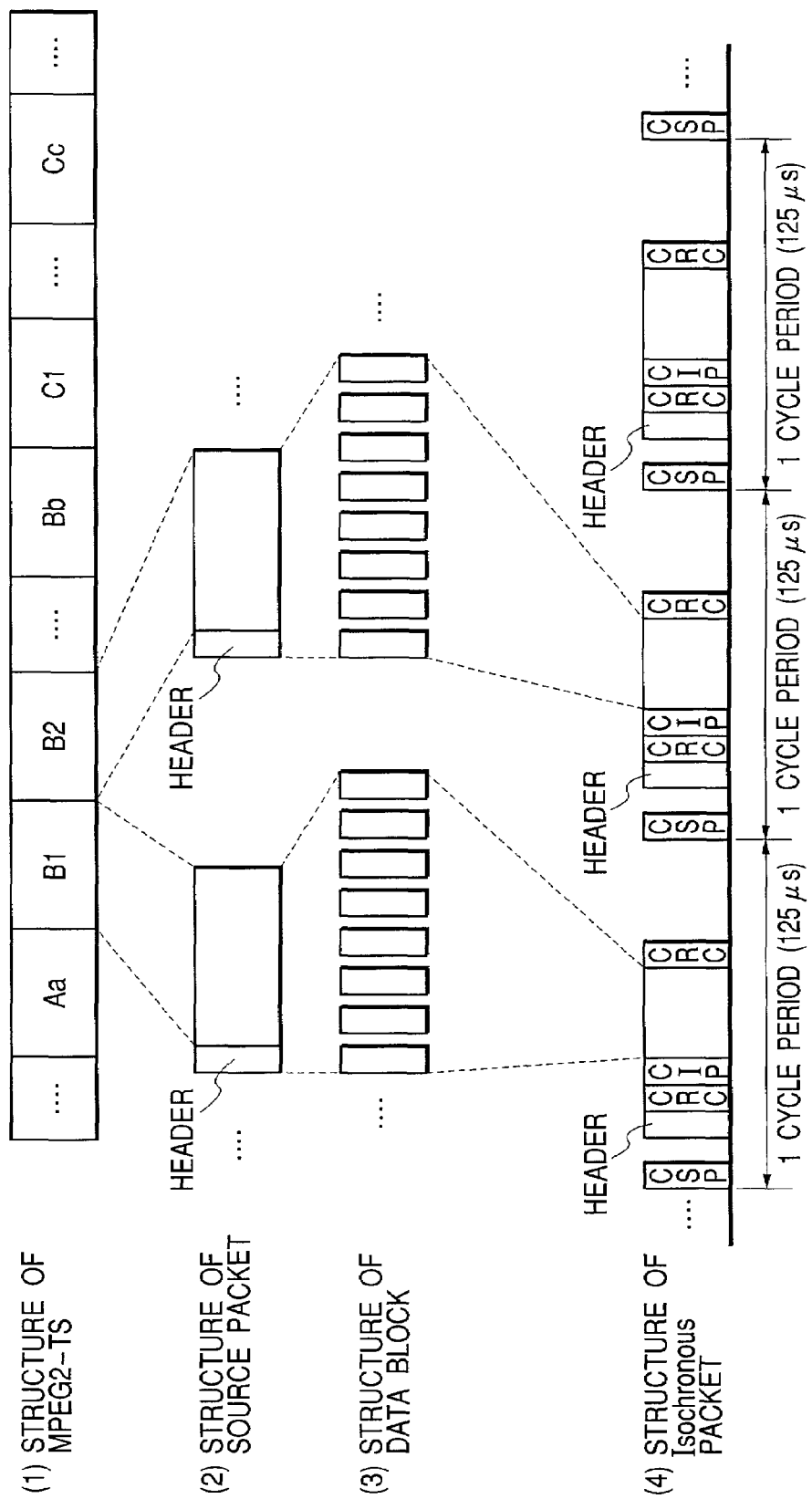
FIG. 4 is a detail explanatory view illustrating the process order of a high speed dubbing method in accordance with the first embodiment.

The number of data blocks stored to the data field 504 differs according to a usual dubbing method and a high speed dubbing method. For example, in case of dubbing AV programs B and C of about 5 Mbps through a usual dubbing method, four data blocks are stored to the data field 504 as shown in FIG. 3. On the other hand, in case of dubbing in double the AV programs B and C through a high speed dobbing method, eight data blocks are stored to the data field 505 as shown in FIG. 4 and in case of dobbing in the speed of N multiple, the (4×N) number of data blocks are stored to the data field 504.

In step S206, a digital interface 123 of a digital video recorder 120 receives isochronous packet transmitted isochronously by interfacing one connection and then reconfigures the MPEG-2 TS packet from the received isochronous packet. The reconfigured MPEG-2 TS packets are supplied to a record reproduction unit 122 and a memory 126.

In step S207, the record reproduction unit 122 of the digital video recorder 120 records the MPEG-2 TS packets supplied from the digital interface 123 as a usual bit rate to the recording medium 121.

In step S208, a control unit 111 of the camera integral digital video recorder 100 discriminates whether the dubbing of all programs selected from the step S201 is ended or not. When the dubbing is ended, a usual dubbing end is informed to a user by using the operation unit 110 or the display unit 108.

Next, in the above described step S202, a case that the user selects a high speed dubbing method will now be explained with reference to FIG. 1. At this time, the camera integral digital video recorder 100 informs the digital video recorder 120 of the selection of the high speed dubbing method.

In step S209, the control unit 111 of the camera integral digital video recorder 100 calculates the present selectable dubbing speed on the basis of bit rate of AV programs B and C, reproduction and transmission capacity of the camera integral digital video recorder 100, receiving and recording capacity of the digital video recorder 120, and the present usable isochronous resources (channel number and bandwidth need in isochronous transfer mode of IEEE1394 standard). The dubbing speed calculated from the control unit 111 is informed to the user by using the operation unit 110 or the display unit 108. The user selects a desired dubbing speed N (N=2, 4, 8, multiples of 8 . . . ) among the informed dubbing speeds by using the operation unit 110 or the display unit 108. The selected dubbing speed N is informed to the digital video recorder 120 from the camera integral digital video recorder 100.

In step S210, the digital interface 106 of the camera integral digital video recorder 100 obtains isochronous resources required to dub the speed of N multiply of AV programs B and C and establishes one logical signal path (connection) between the digital interfaces 106 and 123.

In step S211, the record reproduction unit 105 of the camera integral digital video recorder 100 reproduces the MPEG-2 TS packet of AV programs B and C in the recording medium 104 by N times bit rate of usual bit rate. The reproduced MPEG-2 TS packet is supplied to the digital interface 106 and the memory 109.

Here, a process order for confirming AV programs B and C dubbed digitally by N times in a reproduction party will be described. Firstly, the decoder unit 107 decodes by changing AV programs B and C reproduced as a usual N times bit record into a usual bit rate by using the memory 109. Specifically, a reduction process is performed with a 1/GOP (group of pictures, where one GOP is constituted to digital video data of 15 frames) rate by using the memory 109 and then changed into a usual bit rate. Next, the display unit 8 displays digital video data changed in the decoder unit 107. As constructed above, the user can confirm simply the contents of AV programs B and C performed the high speed dubbing in the display unit of the reproduction party.

In step S212, the digital interface 106 of the camera integral digital video recorder 100 produces isochronous packet from the MPEG-2 TS packet reproduced in the record reproduction unit 105 according to the order of reduction as shown in FIG. 4. The produced isochronous packet is transmitted to the digital interface 123 of the digital video recorder 120 by interfacing the connection set in the step S210.

The process order of a high speed dubbing method in accordance with the first embodiment will be described with reference to FIG. 4.

(1) of FIG. 4 is a view illustrating an example of the structure of an MPEG-2 TS packet recorded on the recording medium 104. Each of MPEG-2 TS packets B1 through Bb and C1 through Cc respectively constituting AV programs B and C has a fixed length of 188 bytes. The record reproduction unit 105 sequentially reproduces the MPEG-2 TS packet of AV programs B and C by N times bit rate of a usual bit rate, and supplies the same to the digital interface 106.

(2) of FIG. 4 is a view explaining the order of generating a source packet from each MPEG-2 TS packet. The digital interface 106 adds a source packet header of 4 bytes to each of the MPEG-2 TS packets of 188 bytes supplied from the record reproduction unit 105, and generates a source packet (one source packet is 192 bytes). This source packet header contains a time stamp (time information) of 25 bits. The receiving party controls timing for reproducing AV programs with reference to this time stamp.

(3) of FIG. 4 is a view explaining the order of generating a data block from each source packet. The digital interface 106 divides each source packet into data blocks of 24 bytes. Resultantly, 8 data blocks are generated from one source packet.

(4) of FIG. 4 is a view explaining the order of generating one isochronous packet from a plurality of data blocks. The digital interface 106 determines a number M (M=0, 1, 2, 3, 4, 8, multiples of 8 . . . ) stored in one isochronous packet according to the dubbing speed N selected in the step S209. Each of isochronous for storing a number M data block is transmitted isochronously at every communication cycle of about 125 μs.

Therefore, for example, in case of highly dubbing an AV program B of about 5 Mbps of bit rate by two times dubbing speed, the digital interface 106 stores eight data blocks to one isochronous packet. In case of dubbing the AV program B by N times dubbing speed, the digital interface 106 stores the (4×N) number of data blocks to one isochronous packet.

In step S213, the digital interface 123 of the digital video recorder 120 receives isochronous packet transmitted isochronously from the digital interface 106 and then reconfigures the MPEG-2 TS packet from the received isochronous packet. The reconfigured MPEG-2 TS packets are supplied to a record reproduction unit 122 and a memory 126.

Here, a process order for confirming AV programs B and C dubbed digitally by N times in a reproduction party will be described. Firstly, the decoder unit 124 decodes by changing AV programs B and C reproduced and transmitted as a usual N times bit record into a usual bit rate by using the memory 109. Specifically, a reduction process is performed with a rate of 1/a number N of GOP by using the memory 109 and then changed into a usual bit rate. Next, the display unit 125 displays digital video data decoded in the decoder unit 124. As constructed above, the user can confirm simply the contents of AV programs B and C performed the high speed dubbing in the display unit of the recording party.

In step S214, the record reproduction unit 122 of the digital video recorder 120 records MPEG-2 TS packets supplied from the digital interface 123 to the recording medium 121 by N times bit rate of usual bit rate.

In step S215, the control unit 111 of the camera integral digital video recorder 100 discriminates whether the dubbing of all programs selected from the step S201 is ended or not. When the dubbing is ended, a usual dubbing end is informed to the user by using the operation unit 110 or the display unit 108.

As above explained, according to the first embodiment, since the number of data blocks stored to one isochronous packet can be changed according to the dubbing speed, it is possible to perform a high speed dubbing of the AV program of MPEG-2 TS method.

In addition, according to the first embodiment, the contents of AV program being dubbed with high speed can confirm simply in the reproduction party and the recording party.

Second Embodiment

Next, a dubbing system according to the second embodiment will be described.

In addition, since the structure of the dubbing system according to the second embodiment is the same structure of FIG. 1, it will be described with reference to FIG. 1.

In the second embodiment, the data block of each AV program is stored to one isochronous packet and a system for collectively dubbing each AV program will be described.

Figure 6:
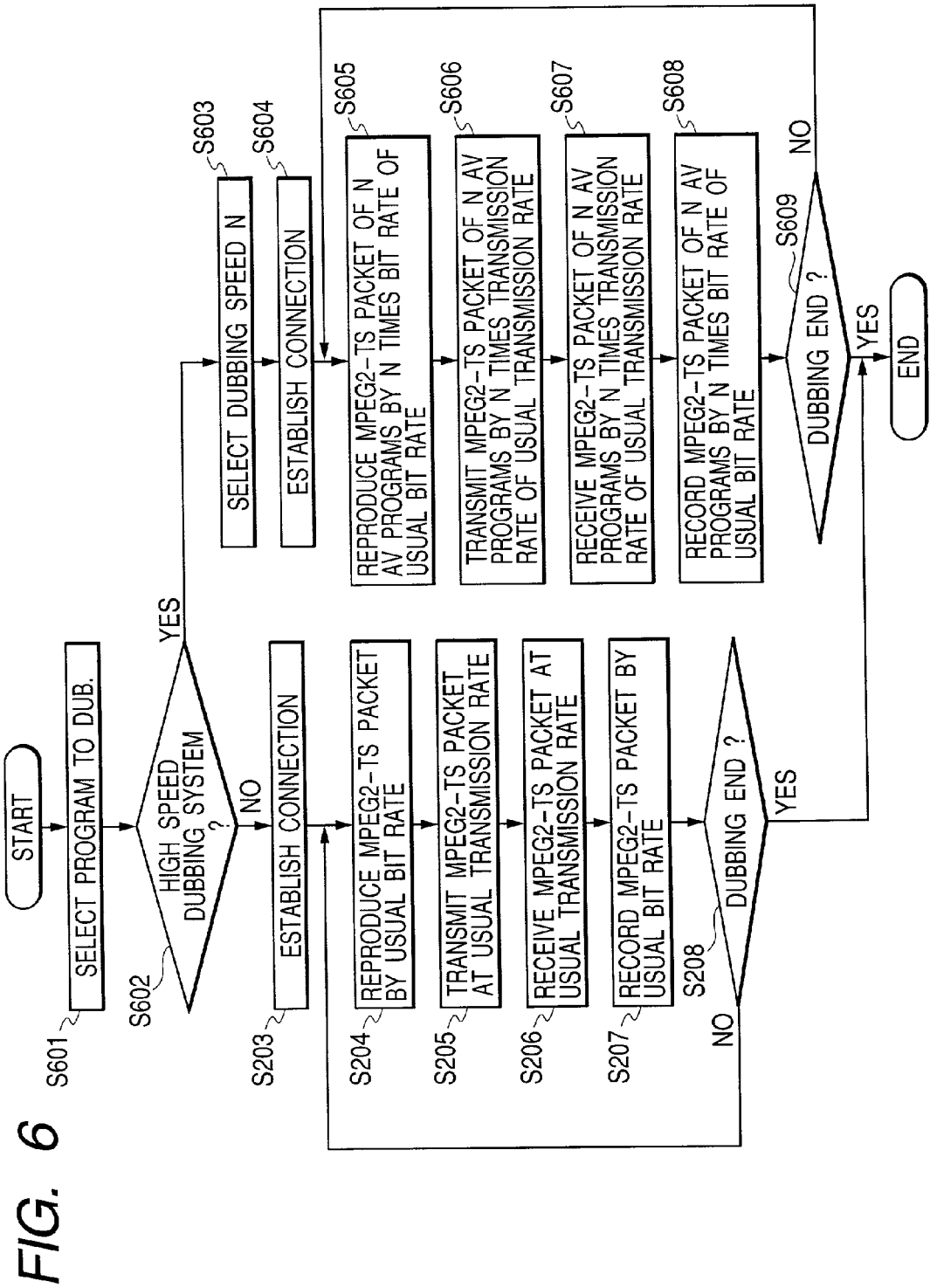
FIG. 6 is a flow chart illustrating the process order of a dubbing system in accordance with a second embodiment.

FIG. 6 is a flow chart illustrating the process order of a dubbing system in accordance with the second embodiment. In the second embodiment, the camera integral digital video recorder 100 is a reproduction party (transmission party) and the digital video recorder 120 is a recording party (receiving party), and the process order for dubbing an AV program selected by a user between the camera integral digital video recorder 100 and the digital video recorder 120. In addition, in FIG. 6, the same reference numerals are given to the steps for performing the functions of FIG. 2 and its explanation is omitted.

In step S601, a user operates the operation unit 110 of the camera integral digital video recorder 100 and sets the present operation mode into a dubbing mode, and thereafter, selects a plurality of AV programs for dubbing in the digital video recorder 120 among the AV programs recorded to the recording medium 104. In this embodiment, a case of selecting AV programs B and C of about 5 Mbps of bit rate will be described by using FIG. 7.

In step S602, the control unit 111 of the camera integral digital video recorder 100 inquires of the user about a dubbing method of the selected AV program. In a case that the user selects a usual dubbing method, the routine proceeds to step S203. In a case that the user selects a high speed dubbing method, the routine proceeds to step S603.

The case that the user selects the usual dubbing method (steps S203 through S208) will be processed as FIG. 2 and the explanation will be omitted.

Next, the case that the user selects the high speed dubbing method will be explained. At this time, the camera integral digital video recorder 100 informs the digital video recorder 120 of the selection of the high speed dubbing method.

In step S603, the control unit 111 of the camera integral digital video recorder 100 calculates the present selectable dubbing speed on the basis of bit rate of the AV program selected from the step S601, reproduction and transmission capacity of the camera integral digital video recorder 100, receiving and recording capacity of the digital video recorder 120, and the present usable isochronous resources (channel number and bandwidth needed in isochronous transfer mode of IEEE1394 standard). The dubbing speed calculated from the control unit 111 is informed to the user by using the operation unit 110 or the display unit 108. The user selects a desired dubbing speed N (N=2, 4, 8, multiples of 8 . . . ) among the informed dubbing speeds by using the operation unit 110 or the display unit 108. In the second embodiment, the number (N) of AV programs for collectively dubbing is determined according to the dubbing speed N selected from the step S603. The selected dubbing speed N is informed to the digital video recorder 120 from the camera integral digital video recorder 100.

In step S604, the digital interface 106 of the camera integral digital video recorder 100 obtains isochronous resources required to dub the speed of N multiply of AV programs B and C and establishes one logical signal path (connection) between the digital interfaces 106 and 123.

In step S605, the record reproduction unit 105 of the camera integral digital video recorder 100 reproduces the MPEG-2 TS packet of the number of N of AV programs in the recording medium 104 by N times bit rate of usual bit rate. The reproduced MPEG-2 TS packet of the number of N of AV programs is supplied to the digital interface 106 and the memory 109.

Here, a process order for confirming the number of N of AV programs dubbed digitally by N times in a reproduction party will be described. First, the decoder unit 107 decodes selectively one of the numbers of N of AV program being dubbed with a high speed by using the memory 109. Next, the display unit 8 displays digital video data decoded in the decoder unit 107. As constructed above, the user can confirm simply the contents of one of the numbers of N of AV program being dubbed with a high speed in the display unit of the reproduction party at a usual reproduction speed.

In step S606, the digital interface 106 of the camera integral digital video recorder 100 produces isochronous packet from the MPEG-2 TS packet reproduced in the record reproduction unit 105 according to the order of reduction as shown in FIG. 7. The produced isochronous packet is isochronously transmitted to the digital interface 123 of the digital video recorder 120 by interfacing the connection set in the step S120.

A process order of a high speed dubbing method in accordance with the second embodiment will be described with reference to FIG. 7.

(1) of FIG. 7 is a view illustrating an example of an MPEG-2 TS packet recorded on the recording medium 104. Each of MPEG-2 TS packets B1 through Bb and C1 through Cc respectively constituting AV programs B and C has a fixed length of 188 bytes. The record reproduction unit 105 alternately reproduces the MPEG-2 TS packet of AV programs B and C by N times bit rate of a usual bit rate, and supplies the same to the digital interface 106.

(2) of FIG. 7 is a view explaining the order of generating a source packet from each MPEG-2 TS packet. The digital interface 106 adds a source packet header of 4 bytes to each of the MPEG-2 TS packets B1 through Bb and C1 through Cc supplied from the record reproduction unit 105, and generates a source packet.

(3) of FIG. 7 is a view explaining the order of generating a data block from each source packet. The digital interface 106 divides each source packet into data blocks of 24 bytes as described in (3) of FIG. 4.

(4) of FIG. 7 is a view explaining the order of generating one isochronous packet from a plurality of data blocks. The digital interface 106 determines a number M (M=0, 1, 2, 3, 4, 8, multiples of 8 . . . ) stored in one isochronous packet according to the dubbing speed N selected in the step S603. Each of isochronous for storing number M data blocks is transmitted isochronously at every communication cycle of about 125 μs.

Therefore, for example, in case of highly dubbing an AV program B of about 5 Mbps of bit rate by two times dubbing speed (N=2), the digital interface 106 stores eight data blocks (four data blocks of these data belongs to the AV program B and the remnant four data blocks of these belongs to the AV program C) to one isochronous packet.

In step S607, the digital interface 123 of the digital video recorder 120 receives isochronous packet transmitted isochronously from the digital interface 106 and then reconfigures the MPEG-2 TS packet from the received isochronous packet. The reconfigured MPEG-2 TS packets are supplied to a record reproduction unit 122 and a memory 126.

Here, a process order for confirming one of the numbers of N of AV program dubbed digitally by N times in a reproduction party will be described. Firstly, the decoder unit 124 decodes selectively one of the numbers of N of AV program reproduced with a high speed by using the memory 109. Next, the display unit 125 displays digital video data decoded in the decoder unit 124. As constructed above, the user can confirm simply the contents of one of the numbers of N of AV program performed the high speed dubbing in the display unit of the recording party.

In step S608, the record reproduction unit 122 of the digital video recorder 120 records the MPEG-2 TS packets supplied from the digital interface 123 by N times bit rate of a usual bit rate to the recording medium 121.

In step S609, the control unit 111 of the camera integral digital video recorder 100 discriminates whether the dubbing of all programs selected from the step S201 is ended or not.

When the dubbing is ended, a high speed dubbing end is informed to a user by using the operation unit 110 or the display unit 108.

As above explained, according to the second embodiment, since the different data blocks of the number of N of AV programs can be stored to one isochronous packet, it is possible to perform a high speed dubbing of the number of N of different AV programs.

In addition, according to the second embodiment, the user can confirm simply the contents of one of the numbers of N of AV program performed the high speed dubbing at a usual reproduction speed in both reproduction party and recording party. Also, when performing a high speed dubbing, the AV program capable of confirming the contents with a usual reproduction speed in both reproduction party and recording party may be controlled automatically by the digital video recorder or selected by an operation of the operation unit by the user. Also, in a case that the digital video recorder selects automatically, the AV program for reproducing and displaying at every predetermined time may be displayed by switching.

Third Embodiment

Although, in the first and second embodiments as described above, a case that the camera integral digital video recorder 100 is a reproduction party (transmission party) and the digital video recorder 120 is a recording party (receiving party) is described, the present invention does not limited the structure as that. The digital video recorder 120 may be a reproduction party (receiving party) and the camera integral digital video recorder 100 may be a recording party (transmission party).

Also, in the first and second embodiments as described above, although a case that a program for dubbing is selected through the camera integral digital video recorder 100 as the reproduction party and thereafter the dubbing speed of the selected AV program is determined is described, the present invention does not limited as the structure. The program for dubbing may be selected through the digital video recorder 120 as the recording party and thereafter the dubbing speed of the selected AV program may be determined.

Also, in the first and second embodiments as described above, although a case that the AV program of MPEG-2 TS method between the camera integral digital video recorder 100 and the digital video recorder 120 is dubbed with a high speed is described, the present invention does not limited as the structure. The embodiments may be implemented among a plurality of the camera integral digital video recorder 100 and a plurality of the digital video recorder 120.

Further, the functions of the first and second embodiments can be achieved by software. In this case, a recording medium storing the program codes of software is supplied to an apparatus of each embodiment or a computer within each system in order to implement the functions of each embodiment and then the apparatus and the computer (CPU or MPU) of the system control the apparatus or system of each system according to the program codes stored to the recording medium, thereby performing the functions of each embodiment.

Further, in this case, the program code of the software itself performs the functions of the embodiments as described above. A floppy disk, a hard disk, an optical disk, a CD-ROM, a magnetic tape, a non-volatile memory card and a ROM can be used as the recording medium supplied to the program code.

The invention may be embodied in other specific forms without departing from essential characteristics thereof.

Therefore, the above-described embodiments are merely exemplary of this invention, and are not be construed to limit the scope of the present invention.

The scope of the present invention is defined by the scope of the appended claims, and is not limited to only the specific descriptions in this specification. Furthermore, all the modifications and changes belonging to equivalents of the claims are considered to fall within the scope of the present invention.

What is claimed is:

1. A reproducing apparatus capable of reproducing digital information at a predetermined bit rate corresponding to a predetermined dubbing speed, comprising:
    a calculating unit which calculates available dubbing speeds based on a transmission capacity of the reproducing apparatus;
    a selecting unit which selects a dubbing speed N times the predetermined dubbing speed among the available dubbing speeds calculated by the calculating unit, wherein N is 2, 4 or 8;
    a reproducing unit which reproduces digital information including a plurality of fixed-length packets from a first recording medium at a bit rate N times the predetermined bit rate corresponding to the dubbing speed N times the predetermined dubbing speed selected by the selecting unit; and
    a transmission unit which (a) determines the number of the fixed-length packets included in one transmission packet in accordance with the dubbing speed N times the predetermined dubbing speed selected by the selecting unit, (b) generates transmission packets from the digital information reproduced from the first recording medium, wherein each of the transmission packets includes the determined number of fixed-length packets, and (c) transmits the transmission packets to an external recording device so that the external recording device can record the digital information to a second recording medium at a bit rate N times the predetermined bit rate corresponding to the dubbing speed N times the predetermined dubbing speed selected by the selecting unit.

2. The reproducing apparatus according to claim 1, wherein the fixed-length packet is a transport stream packet defined by an MPEG-2 system standard.

3. The reproducing apparatus according to claim 1, wherein the transmission unit transmits the transmission packet by an isochronous transfer.

4. The reproducing apparatus according to claim 2, wherein the transmission unit transmits the transmission packet by an isochronous transfer.

5. The reproducing apparatus according to claim 1, further comprising a display unit which displays the digital information reproduced from the first recording medium.

6. A method of controlling a reproducing apparatus capable of reproducing digital information at a predetermined bit rate corresponding to a predetermined dubbing speed, comprising the steps of:
    calculating available dubbing speeds based on a transmission capacity of the reproducing apparatus;
    selecting a dubbing speed N times the predetermined dubbing speed among the available dubbing speeds calculated in the calculating step, wherein N is 2, 4 or 8;
    reproducing digital information including a plurality of fixed-length packets from a first recording medium at a bit rate N times the predetermined bit rate corresponding to the dubbing speed N times the predetermined dubbing speed selected in the selecting step;
    determining the number of the fixed-length packets included in one transmission packet in accordance with the dubbing speed N times the predetermined dubbing speed selected in the selecting step;
    generating transmission packets from the digital information reproduced from the first recording medium, wherein each of the transmission packets includes the determined number of fixed-length packets; and
    transmitting the transmission packets to an external recording device so that the external recording device can record the digital information to a second recording medium at a bit rate N times the predetermined bit rate corresponding to the dubbing speed N times the predetermined dubbing speed selected in the selecting step.

7. The method according to claim 6, wherein the fixed-length packet is a transport stream packet defined by an MPEG-2 system standard.

8. The method according to claim 6, wherein the transmission packet is transmitted by an isochronous transfer.

9. The method according to claim 7, wherein the transmission packet is transmitted by an isochronous transfer.

10. The method according to claim 6, further comprising a step of displaying the digital information reproduced from the first recording medium on a display unit.

11. A dubbing system comprising:
    a reproducing device capable of reproducing digital information at a predetermined bit rate corresponding to a predetermined dubbing speed; and
    a recording device,
    wherein the reproducing device including:
    a calculating unit which calculates available dubbing speeds based on a transmission capacity of the reproducing device;
    a selecting unit which selects a dubbing speed N times the predetermined dubbing speed among the available dubbing speeds calculated by the calculating unit, wherein N is 2, 4 or 8;
    a reproducing unit which reproduces digital information including a plurality of fixed-length packets from a first recording medium at a bit rate N times the predetermined bit rate corresponding to the dubbing speed N times the predetermined dubbing speed selected by the selecting unit; and
    a transmission unit which (a) determines the number of the fixed-length packets included in one transmission packet in accordance with the dubbing speed N times the predetermined dubbing speed selected by the selecting unit, (b) generates transmission packets from the digital information reproduced from the first recording medium, wherein each of the transmission packets includes the determined number of fixed-length packets, and (c) transmits the transmission packets, and
    wherein the recording device including:
    a receiving unit which receives the transmission packets transmitted from the transmission unit; and
    a recording unit which records the digital information to a second recording medium at a bit rate N times the predetermined bit rate corresponding to the dubbing speed N times the predetermined dubbing speed selected by selecting unit.

12. The dubbing system according to claim 11, wherein the fixed-length packet is a transport stream packet defined by an MPEG-2 system standard.

13. The dubbing system according to claim 11, further comprising a display unit which displays the digital information reproduced from the first recording medium.

14. The dubbing system according to claim 11, wherein the transmission unit transmits the transmission packet by an isochronous transfer.

15. The dubbing system according to claim 12, wherein the transmission unit transmits the transmission packet by an isochronous transfer.

* * * * *